United States Patent Office 3,156,736
Patented Nov. 10, 1964

3,156,736
PROCESS FOR PREPARATION OF SYNTHETIC LUBRICANTS
Derek Southern, Heswall Wirral, Charles B. Milne, Little Sutton Wirral, and Gerald Robinson, Chester, England, assignors to Shell Oil Company, a corporation of Delaware
No Drawing. Filed Jan. 4, 1960, Ser. No. 57
Claims priority, application Great Britain, Jan. 8, 1959, 752/59; Apr. 28, 1959, 14,460/59
1 Claim. (Cl. 260—683.15)

This invention relates to a process for the preparation of synthetic lubricants. More particularly, it relates to a process for the preparation of synthetic lubricating oils from alpha-olefins.

The polymerization of olefins has been investigated by previous workers with the dual objects of preparing synthetic lubricating oils and solid polymers. One of the promising types of catalyst is the so-called "Ziegler type" catalyst which specifically comprises combinations of such materials as titanium chloride with aluminum trialkyls. The Ziegler catalysts have been employed for the most part in the production of solid polymers from low molecular weight olefins such as ethylene. Problems have been encountered in utilizing olefins from natural sources, such as cracked petroleum fractions, due not only to the spread in molecular weights of the monomeric olefins but also to the presence of olefins other than terminal olefins and also the presence of branched hydrocarbons which are considered undesirable for some purposes. Furthermore, the presence of non-hydrocarbon constituents or subconstitutents such as sulfur or nitrogen compounds decreases the yield which is desired when utilizing Ziegler polymers. Since one of the primary objectives in the polymerization of low molecular weight hydrocarbons is the production of liquid products in good yield, it has become a problem to find a Ziegler catalyst which would not promote the formation of solid polymers since for many lubricating purposes these must be separated from the liquid product components and any solids formed thereby decrease correspondingly the yield of liquid lubricating polymerized components. Other problems encountered in polymerizations of this kind are the volatility of the low molecular weight polymers formed and the relative instability of the products obtained.

It is an object of this invention to improve the process for the production of synthetic lubricating oils. It is another object of this invention to provide an improved process for polymerizing alpha-olefins. It is a particular object of the invention to provide an improved process for polymerization of alpha-olefins utilizing a special class of Ziegler catalysts. Other objects include the production of polymeric products as described which have improved lubricating properties. Further objects will become apparent during the following complete description of the invention.

Now, in accordance with the present invention, it has been found that polymers having the consistency and properties of lubricating oils and having improved (lower) low temperature viscosity may be prepared from alpha-olefins in substantially higher yields than heretofore by utilizing olefins having from 6 to 18 carbon atoms per molecule, a temperature range coordinated with the catalyst and olefin identity and especially a Ziegler catalyst having two principal components A and B as defined hereinafter, the mole ratio of component B to component A being at least 0.05:1 but less than about 1:1. Still in accordance with this invention it has been found that the products may be stabilized with respect to their color and oxidative resistance by removal of polymerized components having less than about 19 carbon atoms per molecule and still better results are obtained by hydrogenation of the polymerized product either with or without removal of the relatively low molecular weight polymerization components having less than 19 carbon atoms per molecule.

The catalyst used in this specification is formed by mixing at least one component A with at least one component B as defined below. If desired, for example when using higher catalyst (B:A) ratios, other compounds, such as molecular weight modifiers, which are capable of influencing the polymerization process may be used in addition.

In this specification component A is defined as a compound (preferably other than a heat-treated oxide, a carbide, or a naturally-occurring compound), of iron or a metal of Groups 4a, 5a 6a or 7a of the Periodic Classification of Elements, although the compound is more suitably an inorganic compound, for example, a halide, or oxyhalide of a metal of Groups 4a or 5a. It is preferred, however, that component A should comprise a chloride, bromide or iodide of a Group 4a or 5a metal particularly that of titanium, zirconium or vanadium. The most preferred compounds are titanium trichloride or titanium tetrachloride, although the chlorides of, for example, zirconium and vanadium can be used.

Component B should comprise either (1) An aluminum trialkyl; or (2) An aluminum compound of the general formula $R_1R_2AlX$ in with $R_1$ and $R_2$ are similar or dissimilar and each represents a hydrogen atom or a hydrocarbon radical such as an alkyl, alkaryl, aryl, aralkyl, alkenyl, alkynyl, cycloalkyl or cycloalkenyl radical and X represents a hydrogen atom, a halogen atom, an alkoxy group or an aryloxy group or the residue of a secondary amine or amide, mercaptan, thiophenol, carboxylic acid or sulfonic acid; or (3) An aluminum compound of the general formula $RAlX_1X_2$ in which R represents a hydrogen atom or a hydrocarbon radical as in (2) above, and $X_1$ and $X_2$ are similar or dissimilar and each represents a halogen atom, an alkoxy group or an aryloxy group.

Examples of such aluminum compounds are: aluminum triethyl, diethyl aluminum bromide, dimethyl aluminum hydride, phenoxidiethyl aluminum, dimethylaminodiethyl aluminum, piperidyldiethyl aluminum, (methylcyclohexylamino)-diethyl aluminum, diisobutyl aluminum benzoate, ethyl aluminum dichloride, (N-methylamino)-diethyl aluminum, ethylmercapto diethyl aluminum, and diethoxyethyl aluminum and aluminum sesquihalides (equimolar mixtures of dialkylaluminum halides and alkyl aluminum halides) such as ethyl aluminum sesquihalide.

The most preferred aluminum compounds are those in which the alkyl group has less than six carbon atoms, for example, aluminum triethyl or aluminum diethyl chloride, the particularly preferred compound being aluminum triethyl, although aluminum triisobutyl can be used.

The preferred olefins used in the process of the present invention are alpha-olefins and mixtures of olefins containing a large proportion of alpha-olefins. Other suitable olefins are those of the general formula:

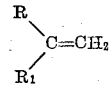

where R and $R_1$ are similar or dissimilar alkyl groups, or mixtures of olefins containing a large proportion of such olefins.

Thus, the olefins used are preferably those obtained by the thermal or catalytic cracking of hydrocarbon feed stock, such feed stock being produced in the refining of crude petroleum oils. Such olefins that are commonly known as cracked wax olefins are particularly preferred. These can be fractionally distilled to obtain the individual olefins having at least six but no more than eighteen carbon atoms in the molecule. Other preferred olefins are those known as cracked raffinate olefins which are obtained from the furfural extraction of heavy cracked cycle oil.

Other olefins which can be used are those produced by the polymerization of lower molecular weight olefins, for example, propylene or butylene or mixtures of propylene and butylene. They may also be those obtained by the dehydration of suitable alcohols or alcohol mixtures.

To obtain a better polymerization reaction and a good yield of polymer it is preferable that the olefin should be purified before polymerizing in the presence of the catalyst. One such method is purification using one of the catalyst components, for example, treatment with a solution of titanium tetrachloride in which the precipitate formed on adding titanium tetrachloride to the olefin is removed by filtration. The filtrate is then washed successively with a dilute solution of hydrochloric acid, for example, a 16% solution and aqueous sodium carbonate, for example, 5% and then distilled water. The olefin is then distilled from sodium.

In another method of purification, that is with sulfuric acid, the olefin, preferably after being deperoxidized by agitation with an acidified aqueous solution of ferrous sulfate, is cooled to and maintained at a temperature below 10° C., and concentrated sulfuric acid, for example, 96% is added dropwise to the vigorously agitated olefin. After removing the acid sludge layer more concentrated sulfuric acid is added under similar conditions. This procedure is repeated once more and after the third extraction the olefin is washed with water, dilute aqueous sodium hydroxide, for example 4% and then water until neutral. The olefin is then treated with a drying agent, for example, calcium chloride or molecular sieves, and then distilled under a reduced pressure of about 1 mm. mercury from sodium carbonate.

It is also possible to purify an olefin by washing with sulfuric acid as above followed by the treatment with titanium tetrachloride as described above.

The best possible results in the preparation of suitable feed stocks for use in the present process comprise extractive crystallization of mixtures of olefins with urea under conditions conductive to the formation of molecular complexes between substantially straight chain alpha-olefins with preferential rejection from such molecular complexes of olefins wherein the unsaturated linkage is not attached to a terminal carbon atom and also where substantially non-straight chain compounds do not form urea complexes.

The process of complex formation with urea is well known together with its variations but broadly comprises contacting urea with a mixture of organic compounds, some of which are capable of forming molecular complexes with urea and others of which remain inert under the conditions employed. This is usually done in the presence of water and a liquid medium which may be additional water or an organic liquid or solvent. The reaction may be heterogeneous or homogeneous, the molecular complexes being crystalline products virtually insoluble in any ordinary liquid medium. The molecular complexes are readily decomposed to recover urea and the extracted organic compounds by the application of heat either in the presence or absence of the solvent either for urea or for the organic compound.

Preferably, olefins purified by any of the above methods are also further purified by percolation through silica gel, although it is also possible to purify the olefins by distillation and percolation through silica gel alone.

The polymerization is most conveniently carried out in a solvent medium, the solvent being substantially inert under the reaction conditions. Suitable solvents include saturated aliphatic hydrocarbons which are liquid under reaction conditions, for example, n-hexane, n-pentane, iso-octane, and n-decane and aliphatic or substantially aliphatic petroleum spirits. The preferred solvents are iso-octane and cyclohexane.

In carrying out the reaction using this type of catalyst system an inert atmosphere in the reaction vessel is essential, otherwise the component By may decompose, reacting violently. Accordingly, after adding the olefin and solvent to the reaction vessel an inert atmosphere is created by purging the vessel with a dry inert gas, for example, nitrogen. The catalyst components dissolved in the inert solvent are then introduced into the vessel. It has been found that a concentration of catalyst to olefin, such that the mole ratio of component A, for example titanium tetrachloride, to olefin lies between 0.005:1 and 0.100:1 is convenient, the preferable mole ratio being between 0.015:1 and 0.040:1.

In accordance with the present invention the olefin, preferably an alpha olefin, is polymerized using a catalyst mole ratio of component B to component A of at least 0.05:1 but less than 1:1, preferably 1:1 to 0.5:1.

For olefins having six, seven or eight carbon atoms in the molecule, especially hexene-1, heptene-1 or octene-1, the preferred mole ratio of component B to component A is at least 0.2:1 but not more than 0.9:1. When polymerizing olefins having nine, ten, eleven, twelve or thirteen carbon atoms in the molecule, particularly decene-1, undecene-1, dodecene-1 or tridecene-1, the preferred mole ratio should be at least 0.05:1 but not more than 0.6:1 and more preferably at least 0.1:1 but not more than 0.6:1. Olefins having at least fourteen carbon atoms but not more than eighteen carbon atoms in the molecule, particularly tetradecene-1, pentadecene-1, hexadecene-1, heptadecene-1 or octadecene-1 should preferably be polymerized using a catalyst mole ratio of at least 0.05:1 but not more than 0.5:1.

It has been found that when using comparatively high catalyst mole ratios, that is 0.5:1 or above, it is desirable that the temperature of reaction should be kept fairly low, that is not higher than 50° C., for at higher temperatures there is in some cases, a tendency of the polymer to become rather viscous. With ratios below about 0.5:1 this tendency is not so significant.

It is preferable therefore that when polymerizing olefins having six, seven, eight or nine carbon atoms in the molecule, especially the alpha-olefins, with a mole catalyst ratio of at least 0.2:1 but not more than 0.9:1 that the temperature of reaction should not rise above 50° C. Similarly, when polymerizing olefins having at least ten but not more than thirteen carbon atoms in the molecule, particularly the alpha-olefins, with a mole catalyst ratio of at least 0.1:1 but not more than 0.6:1 the temperature of reaction should not rise above 50° C.

As a result of the effect of temperature on the viscosity of the polymer by carefully controlling the temperature of reaction it is possible in some cases to produce polymers with the desired properties by using ratios other than the preferred ones quoted above.

Thus, for olefins having six, seven, eight or nine carbon atoms in the molecule, preferably the alpha-olefins, polymers can be produced by using a mole ratio of component B to component A of at least 0.05:1 but less than 0.2:1 provided the temperature of reaction is maintained above 50° C., preferably in the range 60° to 90° C. For olefins having ten, eleven, twelve or thirteen carbon atoms in the molecule, especially the alpha-olefins, a mole ratio of component B to component A of greater than 0.6:1 but not more than 0.9:1 can be used provided the temperature of reaction is less than 10° C. and preferably less than 0° C. Similarly for olefins having at least fourteen but not more than eighteen carbon atoms in the molecule, preferably the alpha-olefins, mole ratios of component B to component A of greater than 0.5:1 and not more than 0.9:1 can be used provided the reaction temperature is less than 10° C. and preferably less than 0° C.

The process of the present invention is suitable not only for the polymerization of olefins having the same number of carbon atoms in the molecule but also for the polymerization of a mixture of olefins having at least six but not more than eighteen carbon atoms in the molecule. Suitable mixtures are conveniently obtained in the thermal or catalytic cracking of hydrocarbon feed stock or alternatively from the furfural extraction of heavy cracked cycle oil as hereinbefore described.

There are many such mixtures which can be prepared, each having its preferred catalyst ratio according to the range of the number of carbon atoms in the molecule.

Thus, for example, when polymerizing a mixture of olefins comprising the olefins having in the molecule at least six but not more than eight carbon atoms, preferably the alpha-olefins, a catalyst component mole ratio (B:A) of at least 0.2:1 but not more than 0.9:1 is preferred, the temperature of reaction preferably being maintained at not more than 50° C, or alternatively a mole ratio of at least 0.05:1 but less than 0.2:1 provided the temperature of reaction is greater than 50° C. and preferably in the range 60° to 90° C. can be used.

For a mixture comprising the olefins having in the molecule at least nine but not more than thirteen carbon atoms, preferably the alpha-olefins, a mole ratio of component B to component A of at least 0.05:1 but not more than 0.7:1 or preferably at least 0.1:1 but not more than 0.7:1 is suitable, the temperature of reaction preferably being not higher than 50° C. Alternatively, provided the temperature of reaction is maintained less than 10° C. and preferably less than 0° C. a mole ratio of greater than 0.7:1 but not more than 0.9:1 can be used.

For olefin mixtures comprising those olefins having in the molecule at least nine but not more than seventeen carbon atoms, preferably the alpha-olefins, a catalyst component mole ratio (B:A) of at least 0.05:1 but not more than 0.6:1 the temperature of reaction preferably being not higher than 50° C., is preferred; although, provided the reaction temperature is maintained below 10° C. and preferably less than 0° C., a mole ratio of greater than 0.6:1 but not more than 0.9:1 can be used.

Mixtures of olefins comprising those having at least fourteen but more than eighteen carbon atoms, preferably the alpha-olefins, can be suitably polymerized using a mole ratio of component B to component A of at least 0.05:1 but not more than 0.5:1. If the reaction temperature is maintained below 10° C. and preferably less than 0° C. these olefins can be polymerized using mole catalyst ratios of greater than 0.5:1 but not more than 0.9:1.

The reaction time according to the process of the invention is not critical and the reaction should not normally take more than 24 hours and usually takes at least four but not more than twelve hours.

After completion of the reaction, the polymer is treated to inactivate the catalyst and remove the catalyst residues. The inactivation of the catalyst can be accomplished by washing with an alcohol, water or other suitable material, for example, methanol, isopropanol or mixtures thereof. Sometimes the catalyst inactivating treatment also removes a major proportion of the catalyst residues, but usually it is necessary to remove the catalyst residues by treating the polymer with an acid, base or other material, for example, dilute hydrochloric acid followed by sodium carbonate solution. Finally the polymer is separated from solution in the diluent, for example, by distillation, preferably under reduced pressure.

The process of the invention can be carried out as a batch process or it can be adapted to the steady state process. In this latter process a polymerization mixture of constant composition is continuously introduced into the reaction zone and the reaction mixture resulting from the polymerization is continuously withdrawn in amounts equivalent to the rate of introduction of reactants.

The process of the invention is illustrated by the following examples.

EXAMPLE I 4,700 parts by volume of $C_{10}$ olefin was deperoxidized by shaking with an acidified solution of ferrous sulfate.

The olefin was then transferred to a large flask fitted with a Vibro-mixer and dropping funnel, the flask being placed in an ice/water cooling bath and 96% sulfuric acid (40 parts) was added dropwise to the vigorously agitated olefin, the temperature of the reaction mixture being kept below 10° C. After removing the acid sludge layer, 40 parts of 96% sulfuric acid were again added under similar conditions, and finally the procedure was repeated once more. After the third extraction the olefin was washed twice with 400 parts of water, 400 parts of 4% sodium hydroxide solution and then water until neutral. Calcium chloride was used as a drying agent and after filtering, the olefin was distilled under reduced pressure (about 1 mm. Hg) from sodium carbonate.

With infra-red spectrographic analysis it was found that the $C_{10}$ olefin consisted of over 97% decene-1.

The polymerization was then carried out in an apparatus which consisted of a three-neck flask fitted with an air condenser (with bubble tubes), rubber serum cap, and stirrer with a nitrogen-inlet stirrer guide.

80 parts by volume of the olefin was placed in the flask and 110 parts by volume of sodium-dried cyclohexane added. The system was thoroughly purged with dry nitrogen and then in Run 1 0.2 part by volume of aluminum triethyl in cyclohexane was syringed in, followed immediately by 0.8 part by volume of titanium tetrachloride in cyclohexane, the concentration of aluminum triethyl and titanium tetrachloride in cyclohexane being such that the mole ratio of Al:Ti was about 0.2:1, and that the mole ratio of titanium tetrachloride to olefin was about .018:1. The vigorous rate of stirring (2,000 r.p.m.) was maintained throughout the addition and reaction period.

There was a noticeable thickening of the reaction mixture after one or two hours, but the polymerization was continued for a total reaction time of 22 hours. Hydrolysis was carried out by adding a mixture of isopropanol (20 parts by volume), 10 parts by volume of methanol and 100 parts by volume of benzene to facilitate the transference of the reaction mixture from the flask to the separating funnel.

The solution was then washed with 200 parts by volume of water, 16% (by weight) hydrochloric acid, until the washings were colorless (3 to 5 extractions) twice with 100 parts of 10% sodium carbonate and twice with 100 parts of 10% sodium carbonate and twice with 100 parts by volume of water.

The polymer solution was then transferred to a distillation apparatus where benzene and cyclohexane were stripped off under reduced pressure using a water pump. Unreacted monomer was distilled off at a 180° C. oil-bath temperature under about 1 mm. Hg pressure.

In Run 2 the same procedure was repeated but 0.5 part by volume of the same aluminum triethyl solution were used, such that the mole ratio of Al:Ti was about 0.5:1. In addition the reaction vessel was kept cooled to ensure that the temperature did not rise above 50° C. The polymer produced had the following properties:

|  | AlEt$_3$/ TiCl$_4$, mol. ratio | Conversion, percent wt. | Polymer | | |
| --- | --- | --- | --- | --- | --- |
|  |  |  | VK (cs.) 100° F. | VK (cs.) 210° F. | K.V.I. |
| Run 1 | 0.2:5 | 87 | 31.5 | 6.5 | 155 |
| Run 2 | 0.5:1 | 90 | 30.7 | 6.6 | 160 |

EXAMPLE II

A purified $C_{11}$ olefin was dried and further purified by percolating over silica gel and polymerized by the same procedure as described in Example I except that 200 parts of iso-octane used as solvent and in some runs aluminum diethyl chloride was used as an alternative to aluminum triethyl. The results obtained were as follows:

| Run | AlEt$_3$, pt. by volume | AlEt$_2$Cl, pt. by volume | TiCl$_4$, pt. by volume | Al:Ti, mol. ratio | Reaction temp., °C. | Conversion, percent, by wt. | 100° F. VK cs. | 210° F. VK cs. | K.V.I. | Pour point, °F. |
|---|---|---|---|---|---|---|---|---|---|---|
| 1A | 0.3 | | 0.8 | 0.3:1 | 25 | 68 | 55.0 | 10.1 | 147 | −21 |
| 1B | 0.3 | | 0.8 | 0.3:1 | 25 | 67 | 53.0 | 8.9 | 139 | −49 |
| 2 | 0.3 | | 0.8 | 0.3:1 | 80 | 47 | 40.8 | 7.4 | 142 | −51 |
| 3 | | 0.45 | 0.8 | 0.5:1 | 25 | 61 | 63.7 | 10.7 | 141 | −30 |
| 4A | | 0.29 | 0.8 | 0.3:1 | 25 | 33 | 63.1 | 10.4 | 140 | −28 |
| 4B | | 0.29 | 0.8 | 0.3:1 | 25 | 53 | 64.8 | 10.7 | 140 | −29 |
| 5A | | 0.29 | 0.8 | 0.3:1 | 80 | 70 | 59.3 | 9.4 | 134 | −50 |
| 5B | | 0.29 | 0.8 | 0.3:1 | 80 | 75 | 55.2 | 8.9 | 135 | −51 |

EXAMPLE III

A $C_9$ olefin obtained from the thermal cracking of hydrocarbon feedstock was polymerized using the procedure of Example I using catalyst ratios of 0.3:1 and 0.2:1, when it was found that better yields were obtained using catalyst ratios of 0.3:1. The catalyst concentration was also varied either being about .017 mole TiCl$_4$ per mole of olefin or about .0085 mole TiCl$_4$ per mole of olefin. It was found that better yields were obtained using the higher catalyst:olefin ratio. 400 parts by volume of iso-octane and about 160 parts by volume of olefin were used.

| Run | Temp., °C. | AlEt$_3$, pt. by volume | TiCl$_4$, pt. by volume | Cat. conc. | Cat., mol ratio | Yield, percent by wt. | Pour point, °F. | VK 100° F. cs. | VK 210° F. cs. | K.V.I. |
|---|---|---|---|---|---|---|---|---|---|---|
| 1A | 22 | 1.2 | 3.2 | 2X | 0.3:1 | 92 | −79 | 50.8 | 9.1 | 144 |
| 1B | 22 | 1.2 | 3.2 | 2X | 0.3:1 | 81 | −78 | 44.2 | 9.2 | >155 |
| 2 | 22 | 0.6 | 1.6 | X | 0.3:1 | 77 | −80 | 28.6 | 6.3 | >150 |
| 3A | 22 | 0.8 | 3.2 | 2X | 0.2:1 | 89 | −88 | 44.9 | 8.2 | 145 |
| 3B | 22 | 0.8 | 3.2 | 2X | 0.2:1 | 74 | −70 | 36.9 | 7.8 | >150 |
| 4 | 22 | 0.4 | 1.6 | X | 0.2:1 | 51 | −72 | 33.3 | 7.1 | >150 |
| 5A | 80 | 0.4 | 1.6 | X | 0.2:1 | 52 | −83 | 30.2 | 6.3 | >150 |
| 5B | 80 | 0.4 | 1.6 | X | 0.2:1 | 51 | −94 | 28.7 | 6.2 | >150 |

A "2X" catalyst concentration was one in which the mole concentration of titanium tetrachloride was approximately 0.017 mole per mole of olefin.

EXAMPLE IV

Other olefins were polymerized by the same procedure as in Example I. The results obtained were as follows:

| Olefin | AlEt$_3$/TiCl$_4$, mol. ratio | Conversion, percent wt. | Polymer VK (cs). 100° F. | Polymer VK (cs.) 210° F. | K.V.I. |
|---|---|---|---|---|---|
| $C_9$ | 0.3:1 | 86.0 | 50.4 | 9.6 | 149 |
| $C_{10}$ | 0.3:1 | 87.0 | 50.2 | 9.1 | 146 |
| $C_{13}$ | 0.15:1 | 80.0 | 79.4 | 13.0 | 141 |
| $C_{14}$ | 0.3:1 | 87.0 | 11.6 | 17.6 | 139 |

EXAMPLE V

Mixtures of olefins were polymerized using the same procedure as in Example I when polymers having the following viscometric properties were obtained:

| Mixture of olefins range | AlEt$_3$/TiCl$_4$, mol. ratio | Conversion, percent wt. | Polymer VK (cs.) 100 °F. | Polymer VK (cs.) 210° F. | K.V.I. |
|---|---|---|---|---|---|
| $C_9$ to $C_{13}$ | 0.15:1 | 84 | 49.2 | 9.1 | 147 |
| $C_9$ to $C_{17}$ | 0.3:1 | 63 | 126 | 20.0 | 141 |
| $C_{14}$ to $C_{18}$ | 0.3:1 | 60 | 83.5 | 13.6 | 141 |

Whereas the $C_9$ to $C_{13}$ and $C_9$ to $C_{17}$ mixtures of olefins were obtained from cracked wax olefins, the $C_{14}$ to $C_{18}$ mixture was obtained from cracked raffinate olefins.

EXAMPLE VI

A mixture of $C_6$ to $C_8$ cracked wax olefins was purified by distillation and percolation through silica gel and then polymerized using the procedure as in Example I. The results obtained are as follows:

| AlEt$_3$/TiCl$_4$, mol. ratio | Conversion, percent by wt. | Polymer VK (cs.) 100° F. | Polymer VK (cs.) 210° F. | K.V.I. |
|---|---|---|---|---|
| 0.3:1 | 84 | 7.4 | 2.2 | 128 |

The oils as prepared in accordance with the description and examples given above are suitable for many synthetic lubricating oil purposes. However, a portion of each of the polymerization products comprises relatively low molecular weight polymers which contribute in the first place to undesirable volatility and in the second place are responsible for a major amount of the instability which may be encountered. Moreover, they appear to be less saturated polymers or at least contain a higher proportion of olefinic linkages per unit of molecular weight than do the higher molecular weight compounds. Consequently, an improvement upon the process already described comprises fractionating the polymerization product in such a way as to eliminate the components of the polymerization product having less than about nineteen carbon atoms per molecule. These are for the most part dimers and trimers of olefinic monomers, the degree of polymerization of the low molecular weight polymers being dependent upon the molecular weight of the olefinic monomer. Wherever reference is made to "dimer" it will be understood that reference is being made to components of the polymerization product having less than about nineteen carbon atoms per molecule. Thus, under this definition will be included some polymers of higher degree if lower molecular weight alpha-olefins were present in the mixture of alpha-olefins utilized in the polymerization process.

The volatility of a liquid depends not only on the physical properties of the components constituting the liquid but also on the proportion of volatile components present. Thus, according to the present process especially where there is only a relatively small proportion of dimer present it is usually sufficient to remove only the dimer to reduce the volatility of the polymer. In other cases, however, it may be necessary to remove the trimer and in extreme cases even the tetramer as well. In general, when polymerizing higher olefins, for example, $C_9$ and above, it is usually sufficient to remove only the dimer. For a mixture of $C_6$ to $C_8$ olefins it is usually necessary to remove the trimer as well from the resulting copolymer, whilst for a $C_6$ polymer it may also be necessary to remove the tetramer.

One of the preferred methods of removing such low molecular weight polymers is by distillation preferably by fractional distillation under reduced pressure. Alternatively the low molecular weight polymer can be removed by distilling under reduced pressure in the presence of steam or superheated steam. Usually the low molecular weight polymers distill off at temperatures not exceeding 170° C. at 0.04 mm. Hg pressure, for example. Solvent extraction (such as with isopropanol) may be utilized in place of distillation.

EXAMPLE VII

A $C_9$ cracked wax olefin cut purified by urea extraction and percolation over silica-gel was polymerized by a semi-continuous method. 280 parts by volume of the purified olefin containing 10.2 parts by volume of triethyl aluminum was pumped into a vessel having an inert atmosphere at about one-quarter of the rate as a solution in 1120 parts by volume of the same $C_9$ purified olefin of 27.2 parts by volume of titanium tetrachloride. The molar ratio of triethyl aluminum to titanium tetrachloride was 0.27:1 and the temperature about 26° C. After removal of solvent and monomer the polymer had the following viscometric properties VK 100° F.=26.7 cs., VK 210° F.=5.68 cs., KVI>150

The dimer (fractions 1 to 4) was removed by fractional distillation under reduced pressure and the results were as follows:

| Fraction No. | Percent weight Cumulative | B. pt., ° C. | Pressure, mm. |
|---|---|---|---|
| 1 | 4.5 | 86 | 0.06 |
| 2 | 8.2 | 86 | 0.06 |
| 3 | 12.4 | 89 | 0.13 |
| 4 | 15.8 | 122 | 0.3 |
| 5 | 20.6 | 161 | 0.2 |
| 6 | 24.8 | 161 | 0.2 |
| 7 | 29.3 | 161 | 0.2 |

Fractions 5, 6 and 7 corresponding to the trimer were also obtained, but on blending them back into the residue consisting of dimer-free polymer the following viscometric properties were obtained:

VK 100° F.=44.8 cs., VK 210° F.=8.0 cs., KVI=142

A volatility test was determined as follows: Approximately 5 gm. of sample containing 1.45% 10-benzyl-phenothiazine was placed in a tin dish and heated in an air circulation oven at 200° C. for 6½ hours. The volatility was taken as the percentage loss in weight after 6½ hours.

Percent by weight loss before dimer removal=32
Percent by weight loss after dimer removal=16

EXAMPLE VIII 82 parts by volume of a $C_9$ cracked wax olefin cut purified by urea extraction and then by percolation over silica-gel were added to a reaction vessel containing 90 parts by volume of iso-octane which had been dried over molecular sieves. The vessel was purged with nitrogen and a solution of titanium tetrachloride in iso-octane (1.6 parts by volume in 15.9 parts by volume) was injected followed by a solution of triethyl aluminum in iso-octane (0.6 part by volume in 5.9 parts by volume). The catalyst component mole ratio $AlEt_3:TiCl_4$ was 0.3:1. After polymerizing for about 22 hours the reaction mixture was treated to yield about 56 parts by weight of polymer (yield about 93%), which had the following viscometric properties:

VK 100° F.=64.9 cs., VK 210° F.=11.7 cs., KVI=147

The volatile fraction of the polymer was then removed by distillation at 240° C. under a reduced pressure of about 0.2 mm. On carrying out the volatility test, described in Example I, the figures obtained before and after removal of the volatile fraction were 26 and 2 respectively.

EXAMPLE IX 600 parts by weight of $C_{12}$ cracked wax olefin cut purified by urea extraction and percolation over silica-gel were polymerized in the absence of solvent by the addition of 8 parts by volume of titanium tetrachloride and 3 parts by volume of triethyl aluminum. The catalyst component mole ratio was 0.3:1 (Al:Ti). After five hours 176 parts by weight of the mixture was removed and treated to yield 135 parts by weight of polymer (yield about 80%) which had the following viscometric properties:

VK 100° F.=85.5 cs., VK 210° F.=13.7 cs., KVI=140

The dimer was removed by distillation at 240° C. at 0.2 mm. The residue had the following properties:

VK 100° F.=144 cs., VK 210° F.=19.4 cs., KVI=133

The polymer containing dimer gave a volatility loss of 10% which dropped to 1.5% after the dimer had been removed.

Still further improvements in the polymerized product may be obtained by hydrogenation thereof either before or after removal of the less desirable low molecular weight fractions as described above. The hydrogenated polymers have a reduced sulfur content, an improved color and greater antioxidant susceptibility. One special aspect of hydrogenation of this particular product is that hydrogenation causes an increase in the pour point of the product which may at times be desirable. However, removal of the polymerized component having less than nineteen carbon atoms per molecule either prior to or subsequent to hydrogenation minimizes this effect or eliminates it entirely since hydrogenation of the relatively higher molecular weight polymerization products does not appear to adversely affect their pour points.

Although any gas mixture can be used containing at least about 50% by weight of hydrogen the remainder being substantially inert it is preferable that reasonably pure hydrogen, for example, at least 95% by weight be used for the hydrogenation.

Although the treatment with hydrogen can be carried out at atmospheric pressure, in order to obtain a more rapid rate of hydrogenation, elevated pressures should preferably be used, for example, from 10 to 50 atmospheres, although higher pressures, for example, 100 atmospheres may be used, if desired.

The treatment with hydrogen is preferably carried out at elevated temperatures, for example, above 50° C., the preferred range being 100° to 200° C. With such elevated pressures and temperatures the hydrogenation should be completed rapidly.

Many hydrogenation catalysts can be used according to the process of the present invention, for example, powdered nickel, copper chromite, cobalt molybdate, molybdenum sulfide, Raney cobalt, nickel oxide on majolica, copper chromite on majolica and palladized charcoal. The preferred catalyst, however, is Raney nickel.

After the hydrogen treatment is complete the solution is filtered and the diluent, if any, removed by distillation.

If desired, the above hydrogenation procedure can be repeated on the hydrogen treated polymer.

EXAMPLE X

A $C_9$ urea extracted cracked wax olefin further purified by washing with sulfuric acid was polymerized using a catalyst mole ratio, triethyl aluminum: titanium tetrachloride of 2:1. The reaction vessel was purged by passing nitrogen into the vessel. 3,300 parts by volume of sodium dried iso-octane followed by 13.5 parts by volume of titanium tetrachloride were introduced into the vessel and the temperature raised to 40° C., 33.5 parts by volume of triethyl aluminum in 100 parts by volume of iso-octane, was added and the mixture stirred for 30 minutes. 1000 parts by weight of the olefin was added over a period of one hour and the solution was stirred for a further 22 hours at ambient temperature.

The catalyst was decomposed by a dropwise addition of a 1:1 mixture of isopropanol and methanol (100 parts by volume) and the solution shaken with 16% hydrochloric acid until all traces of color had been removed, followed by washing with aqueous sodium carbonate and water. The solution was dried by entrainment distillation in the presence of benzene (400 parts by volume) and part of the solvent was removed by distillation.

The polymer solution was divided into three parts and each part was treated with substantially pure hydrogen using different catalysts under the following conditions:

| Catalyst | Temperature, °C. | Pressure, atmospheres | Time, hours |
|---|---|---|---|
| (1) 50 parts by weight NiO on majolica | 150 to 215 | 100 | 3 |
| (2) 20 parts by weight copper chromite on majolica | 150 to 215 | 100 | 4 |
| (3) 60 parts by weight palladized charcoal | 150 to 215 | 100 | 3 |

After hydrogenation the solutions were filtered in the presence of Clarcel using a filter and the hydrogenated polymer was isolated. The products were found to be of better color than the unhydrogenated polymer, being either colorless or of only faint color.

When blended in a proportion of 4% by weight in Cardon HVI 65 the following viscometric properties were obtained:

| | VK 100° F. cs. | VK 210° F. cs. | K.V.I. |
|---|---|---|---|
| (1) | 182.7 | 23.3 | 132 |
| (2) | 112.7 | 19.8 | 145 |
| (3) | 135.2 | 20.3 | 138 |

The corresponding figures for the Cardon HVI 65 base oil are:

VK 100° F. _____cs__ 31.88
VK 210° F. _____cs__ 5.17
KVI _____ 100

When blended in a proportion of 4% by weight in a synthetic lubricant base the VI properties were also improved.

When a minor proportion of ionol was added as antioxidant to the blends they were found to have better resistance to oxidation than similar blends with unhydrogenated polymers as the V.I. improvers.

EXAMPLE XI

A purified $C_{10}$ urea extract cracked wax olefin was polymerized using a component mole ratio, triethyl aluminum:titanium tetrachloride of 1:1. 15 parts by volume of titanium tetrachloride in cyclohexane followed by 12 parts by volume of titanium tetrachloride were injected into a large vessel purged with nitrogen and containing 300 parts by volume of cyclohexane and 300 parts by weight of the olefin. The polymerization was carried out at 150° C. for 22 hours, the catalyst decomposed and the product treated by the procedure of Example X to yield about 246 parts by weight of polymer (82%).

177 parts by weight of the polymer in 400 parts by volume of cyclohexane was treated with pure hydrogen for 6 hours at 160° C. at elevated pressure over 20 parts by weight of Raney nickel as catalyst. The mixture was filtered through a filter aid to remove catalyst and the solvent removed by distillation and the residue topped at 180° C. and 1 mm. Hg pressure to leave 170 parts by weight of polymer.

When blended as 4% by weight in Cardon HVI 65 as base oil the following viscometric properties were obtained:

VK 100° F. _____cs__ 63.8
VK 210° F. _____cs__ 10.4
KVI _____ 139

This polymer was tested for its oxidation stability by heating it at 150° C. in an atmosphere of oxygen in the presence of 100 parts per million of copper powder as catalyst. The number of hours $T_{650}$ and $T_{1000}$, required for 100 parts by weight of polymer to absorb 650 or 1000 parts by volume of oxygen respectively were determined. The test was repeated in the presence of 0.73% 10-benzylphenothiazine as antioxidant.

The results obtained were as follows:

| | $T_{650}$ (hours) | $T_{1000}$ (hours) |
|---|---|---|
| Polymer alone | 2 | 3 |
| Polymer with antioxidant | 65 | 113 |

In the presence of antioxidant the values obtained were about 50% greater than the corresponding results obtained when using a polymer which had not been treated with hydrogen.

EXAMPLE XII

A hydrogenated polymer suitable as a lubricating oil was prepared using a catalyst component mole ratio triethyl aluminum:titanium tetrachloride of 0.5:1. The monomer was an urea extract $C_9$ cracked wax olefin and the polymerization procedure was similar to that of Example X.

The solvent and unreacted monomer were removed by distillation under reduced pressure and 85% yield of polymer, pale yellow in color was obtained.

2260 parts by weight of polymer were dissolved in 2,000 parts by volume of cyclohexane, and the solution divided into two portions which were treated with substantially pure hydrogen separately in an autoclave at 190° C. for 10 hours at elevated pressure in the presence of Raney nickel. The solution was filtered, the solvent was removed by distillation, and the hydrogenation repeated using a freshly prepared sample of Raney nickel.

The product after treatment with hydrogen was filtered and the solvent removed by distillation and it was found that much of the color had been removed during the hydrogenation. The product was subjected to vacuum distillation and a fraction boiling between 135° C. and 162° C. under 0.5 mm. Hg pressure was collected, this probably corresponding to the dimer. The residue comprising hydrogen treated polymer was almost colorless while the separated dimer was pale yellow.

The viscometric properties of the hydrogen treated dimer-free polymer were:

VK 100° F. _____ 206
VK 210° F. _____ 30.2
KVI _____ 138

The pour point of the dimer-free polymer was −35° C. compared with 20° F. before removal of dimer.

EXAMPLE XIII

A $C_9$ urea extract cracked wax olefin was polymerized using triethyl aluminum and titanium tetrachloride in mole ratios of 0.3:1 and 0.2:1 by the procedure of Example X.

The polymers were treated with hydrogen at 190° C. and under pressure for 5 hours over Raney nickel and it was found that the pour points 21° F. and 29° F. respectively had risen by about 100° F. as compared with those before hydrogenation.

The viscometric properties were:

| Component mole ratio Al:Ti | VK 100° F. | VK 210° F. | K.V.I. |
| --- | --- | --- | --- |
| (1) 0.3:1 | 45.1 | 8.2 | 144 |
| (2) 0.2:1 | 48.7 | 9.7 | >150 |

The polymer (1) produced using a 0.3:1 mole component ratio was then distilled under reduced pressure to remove the dimer and it was found that the pour point decreased from 21° F. to −74° F. The viscometric properties were:

VK 100° F. _____cs__ 82.8
VK 210° F. _____cs__ 12.2
KVI _____ 133

The polymers obtained were suitable as lubricating oils and showed good oxidation stability when a minor proportion of antioxidant was blended with them.

EXAMPLE XIV

A $C_9$ urea extract cracked wax olefin was polymerized by the procedure of Example XIII using a catalyst component mole ratio (Al:Ti) of 0.3:1.

After polymerization the dimer was removed by fractional distillation under reduced pressure and the dimer-free polymer then treated with hydrogen by the procedure of Example XIII. The pour point was −70° F. and the viscometric properties obtained were:

VK 100° F. _____cs__ 93.0
VK 210° F. _____cs__ 13.4
KVI _____ 133

This polymer was found to be suitable as a lubricating oil and showed good oxidation stability when blended with a minor proportion of an antioxidant.

EXAMPLE XV

Mixtures of $C_8/C_9$ and $C_9/C_{10}$ urea extract cracked wax olefins were polymerized using catalyst component mole ratio, aluminum triethyl:titanium tetrachloride of 0.3:1 and 0.15:1 respectively and treated with hydrogen by the procedure of XI using Raney nickel as catalyst. The dimer was removed by fractional distillation under reduced pressure. The polymers which were suitable as lubricating oils were found to have the following viscometric properties:

| Monomer | $C_8/C_9$ | $C_9/C_{10}$ |
| --- | --- | --- |
| VK 210° F., cs | 7.7 | 7.7 |
| VK 100° F., cs | 45.7 | 44.2 |
| K.V.I. | 135 | 139 |
| Pour point, ° F. | −86 | −65 |

The oxidation stability was tested by the procedure described in Example XI using 100 parts per million of copper powder, with 1.45% by weight of added 10-benzylphenothiazine and heating at 175° C. in an atmosphere of oxygen.

The results obtained were as follows:

| Monomer | $C_8/C_9$ | $C_9/C_{10}$ |
| --- | --- | --- |
| $T_{650}$ (hours) | 55 | 81 |
| $T_{1000}$ (hours) | 82 | 116 |

EXAMPLE XVI

A $C_9$ urea extract cracked wax olefin was polymerized using a catalyst component mole ratio, aluminum triethyl:titanium tetrachloride of 0.5:1 and treated with hydrogen using Raney nickel as catalyst as in Example XV. The dimer was removed by fractional distillation under reduced pressure.

The polymer which was suitable as a lubricating oil was shown to have the following viscometric properties:

VK 210° F. _____cs__ 29.7
VK 100° F. _____cs__ 208
KVI _____ 136

The oxidation stability was treated by the same procedure as described in Example XV with added 10-benzylphenothiazine and the results obtained were as follows:

Hours
$t_{650}$ _____ 46
$t_{1000}$ _____ 67

EXAMPLE XVII $C_{14}$ to $C_{18}$ cracked raffinate olefin cuts were urea-extracted and purified in different ways before being polymerized by the procedure of Example I using a $TiCl_4$:olefin mole ratio of 0.054:1 and an aluminum triethyl:titanium tetrachloride mole ratio of 0.3:1. 100 parts by volume of iso-octane were used as solvent for 75 parts by volume (60 parts by weight) of olefin and the order of addition for all polymerizations was (1) iso-octane, (2) $TiCl_4$, (3) $AlEt_3$ and (4) $C_{14}$ to $C_{18}$ olefin cut.

The urea-extraction and purification treatments before polymerization were as follows:

(1) Urea extraction in which the adduct was washed with aliphatic petroleum spirits.
(2) As (1) above and in addition distillation before polymerization.
(3) As (2) above with a further purification by percolation through silica gel.

In each case polymers suitable as lubricating oils were obtained having the following properties:

| Procedure | Yield, percent by wt. | VK 100° F., cs. | VK 210° F., cs. | K.V.I. |
| --- | --- | --- | --- | --- |
| (1) | 49 | 99.6 | 16.4 | 143 |
| (2) | 60 | 83.5 | 13.6 | 141 |
| (2) | 67 | 88.0 | 14.1 | 140 |
| (2) | 64 | 76.0 | 12.7 | 142 |
| (2) | 65 | 79.5 | 13.2 | 142 |
| (3) | 66 | 89.4 | 14.3 | 140 |
| (3) | 64 | 86.5 | 14.0 | 141 |

EXAMPLE XVIII

The effect of catalyst:olefin concentration and the influence of solvent on the rate of polymerization of 60 parts by weight of a $C_{10}$ cracked-wax olefin cut purified by urea-extraction and percolation through silica-gel using an $AlEt_3$:$TiCl_4$ mole ratio of 0.3:1 is illustrated by the results obtained below. In general, the rate of polymerization increases with increase in the catalyst concentration and decreases with an increase in the quantity of diluent used. The polymerization procedure was the same as that in Example I.

In the following table 2A represents a TiCl₄:olefin mole ratio of 0.34:1.

| Catalyst Concn. | Time | Solvent | Yield percent olefin content | Pour Point, °F. | VK 100° F., cs. | VK 210° F., cs. | K.V.I. |
|---|---|---|---|---|---|---|---|
| 2A | 15 min | "No solvent" | 77 | −70 | 72.4 | 11.4 | 137 |
| 2A | 15 min | do | 81 | −64 | 73.8 | 11.6 | 137 |
| 2A | 5 hr | do | 81 | −64 | 73.1 | 11.4 | 136 |
| 2A | 5 hr | do | 88 | −67 | 74.0 | 11.5 | 137 |
| 2A | 22 hr | do | 85 | −64 | 75.6 | 11.9 | 138 |
| 2A | 22 hr | do | 86 | −64 | 69.9 | 11.2 | 138 |
| A | 1 hr | do | 58 | −44 | 33.6 | 6.97 | 156 |
| A | 1 hr | do | 61 | −37 | 33.0 | 6.75 | 156 |
| A | 5 hr | do | 79 | −35 | 36.8 | 7.32 | 151 |
| A | 5 hr | do | 85 | −38 | 34.7 | 7.04 | 154 |
| A | 22 hr | do | 79 | −42 | 40.9 | 7.86 | 149 |
| A | 22 hr | do | 80 | −39 | 41.2 | 7.90 | 149 |
| A | 2 hr | 100 pts. by vol. | 35 | −51 | 38.7 | 8.15 | 157 |
| A | 2 hr | do | 35 | −50 | 31.0 | 6.83 | 162 |
| A | 5 hr | do | 62 | −38 | 35.7 | 7.75 | 159 |
| A | 5 hr | do | 60 | −42 | 32.1 | 6.95 | 161 |
| A | 22 hr | do | 81 | −40 | 38.7 | 7.78 | 153 |
| A | 22 hr | do | 78 | −44 | 46.1 | 7.85 | 137 |
| A | 22 hr | do | 78 | −52 | 41.9 | 8.24 | 152 |
| 2A | 2 hr | do | 69 | −41 | 38.7 | 7.84 | 161 |
| 2A | 2 hr | do | 72 | −42 | 44.6 | 8.72 | 164 |
| 2A | 5 hr | do | 78 | −44 | 48.3 | 8.99 | 162 |
| 2A | 5 hr | do | 82 | −38 | 45.2 | 8.38 | 165 |
| 2A | 22 hr | do | 84 | −38 | 53.5 | 9.65 | 163 |
| 2A | 22 hr | do | 85 | −41 | 53.2 | 10.0 | 166 |

NOTE.—In the systems termed "no solvent", iso-octane was present to the extent of about 5 parts by volume per 60 parts by weight of olefin.

EXAMPLE XIX

A urea-extracted C₉ cracked-wax olefin, purified by percolation through silica-gel and pre-treatment with AlEt₃ followed by treatment with activated alumina to remove excess AlEt₃, was polymerized according to the procedure of Example I, using AlEt₃:TiCl₄ mole ratio of 0.3:1.

In some runs the TiCl₄:olefin mole ratio was A, i.e., 0.015:1 and in others 2A, i.e., 0.031:1. Runs were also carried out using 200 parts by volume, 100 parts by volume and no solvent. The solvent when used was iso-octane. The amount of olefin subjected to polymerization in each run was 60 parts by weight. The reaction time was 22 hours.

In each case polymers suitable as lubricating oils having the following properties were obtained:

| Volume of Solvent, pts. by vol. | Catalyst concn. | Yield Percent Olefin Content | VK 100° F., cs. | VK 210° F., cs. | K.V.I. | Pour Point (° F.) |
|---|---|---|---|---|---|---|
| 100 | 2A | 94 | 54.4 | 9.68 | 145 | −35 |
| 100 | 2A | 94 | 59.6 | 10.2 | 142 | −60 |
| 100 | 2A | 89 | 38.5 | 7.65 | >150 | −63 |
| 100 | 2A | 82 | 60.7 | 10.5 | 143 | −70 |
| (¹) | 2A | 89 | 60.4 | 9.69 | 136 | −80 |
| (¹) | 2A | 94 | 55.4 | 9.67 | 143 | −94 |
| 100 | A | 83 | 38.7 | 7.68 | >150 | −53 |
| 100 | A | 85 | 36.0 | 7.46 | >150 | −67 |
| (¹) | A | 85 | 34.6 | 7.05 | >150 | −68 |
| (¹) | A | 94 | 40.8 | 8.07 | >150 | −60 |

¹ The only solvent used in these systems was that in the standard solutions of the catalyst.

EXAMPLE XX 82 parts by volume of a urea-extracted C₁₀ cracked-wax olefin cut purified by percolation through silica-gel was injected with AlEt₃ (0.1 part by volume per 100 parts by volume of olefin) before use and then percolated through alumina directly into the reaction vessel containing 100 parts by volume of iso-octane as solvent. TiCl₄ followed by AlEt₃ in a mole ratio of Al:Ti of 0.3:1 were added. The mole ratio of TiCl₄ to olefin was 0.034:1. Polymerization was carried out by the procedure of Example I, the reaction temperature being maintained at about −25° C., the AlEt₃ being added at about 10° C. below the reaction temperature.

This procedure was repeated in different runs varying the reaction temperature and time. Polymers suitable as lubricating oils were obtained and it was found that the optimum temperature of reaction as far as the viscometric properties, K.V.I. and pour point of the polymer were concerned was about 80° C. The results obtained were as follows:

| Reaction Temp., °C. | Reaction Time (hr.) | Yield percent Olefin | Pour Point (° F.) | VK 100° F., cs. | VK 210° F., cs. | K.V.I. |
|---|---|---|---|---|---|---|
| −23 to −27 | 5 | 12 | −48 | | 8.41 | |
| −23 to −25 | 5 | 8 | −47 | | 8.17 | |
| 14 | 5 | 67 | −44 | 39.0 | 7.93 | 154 |
| 20−25 | 5 | 72 | −42 | 41.4 | 8.52 | 155 |
| 22−27 | 22 | 84 | −50 | 60.1 | 10.7 | 145 |
| 22−23 | 22 | 91 | −45 | 59.2 | 10.4 | 144 |
| 78−90 | 5 | 83 | −71 | 50.5 | 8.52 | 138 |
| 80−85 | 5 | 85 | −72 | 45.9 | 7.91 | 138 |
| 75−80 | 22 | 72 | −82 | 53.3 | 8.82 | 137 |
| 81−82 | 22 | 93 | −72 | 54.9 | 8.93 | 136 |
| 106−115 | 5 | 73 | −82 | 30.8 | 5.82 | 129 |
| 103−115 | 5 | 79 | −80 | 35.0 | 6.45 | 140 |
| 106−112 | 22 | 91 | −85 | 40.1 | 6.83 | 132 |
| 105−109 | 22 | 86 | −80 | 35.1 | 6.29 | 135 |

EXAMPLE XXI

In this example olefins of the type

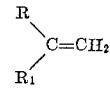

were polymerized using AlEt₃ and TiCl₄. The olefins used were 2,4,4-trimethyl pentene-1, 2-methyl pentene-1 and 2-ethyl hexene-1.

In each run, except that for 2-ethyl hexene-1, the olefin was purified by distillation and then dried by passing over molecular sieves. With 2-ethyl hexene-1, the olefin was merely dried over molecular sieves. The solvent when used, was iso-octane. The polymerization and recovery of polymer from the reaction was carried out by the procedure of Example I. The reaction time was in each case 22 hours.

Polymers with the following properties were obtained:

*The Polymerization of 2,4,4-Trimethylpentene-1*

[60 Parts by weight of olefin were used mole ratio TiCl₄:olefin 0.027:1]

| Volume of Solvent Present, pts. by vol. | Catalyst Ratio Al:Ti | Yield, Percent | Pour Point (° F.) | VK 100° F., cs. | VK 210° F., cs. |
|---|---|---|---|---|---|
| 100 | 0.3:1 | 86 | <−100 | 4.19 | 1.47 |
| 100 | 0.3:1 | 89 | <−104 | 4.07 | 1.45 |
| None | 0.3:1 | 82 | <−104 | 3.91 | 1.40 |
| None | 0.3:1 | 82 | <−108 | 4.06 | 1.43 |

The Polymerization of 2-Methylpentene-1

27 parts by weight of olefin and 45 parts by volume solvent were used in each experiment. The mole ratio $TiCl_4$:olefin was about 0.020:1.

| Catalyst Ratio Al:Ti | Yield, percent wt. | VK 100° F., cs. | VK 210° F., cs. |
|---|---|---|---|
| 0.3:1 | 91 | 3.32 | 1.26 |
| 0.3:1 | 77 | 4.40 | 1.49 |
| 0.5:1 | 100 | 2.98 | 1.92 |
| 0.5:1 | 100 | 2.36 | 1.00 |
| 0.6:1 | 63 | 3.44 | 1.27 |
| 0.6:1 | 82 | 1.77 | 0.83 |

The Polymerization of 2-Ethylhexene-1

42 parts by weight of olefin and 73 parts by volume of solvent were used. The mole ratio $TiCl_4$:olefin was about 0.024:1.

| Catalyst Ratio Al:Ti | Yield, percent | VK 100° F., cs. | VK 210° F., cs. |
|---|---|---|---|
| 0.3:1 | 34 | 4.25 | 1.40 |
| 0.3:1 | 32 | 4.35 | 1.44 |

EXAMPLE XXII

Exactly the same procedure as in Example VII was repeated, only the reaction temperature was about 160° C. Polymers of low volatility were obtained and the properties were as follows:

| State of Polymer | VK 100° F., cs. | VK 210° F., cs. | K.V.I. | Pour Point, °F. |
|---|---|---|---|---|
| Polymer still containing dimer | 45.0 | 7.03 | 122 | −82 |
| Polymer after removal of light ends | 177.0 | 16.6 | 106 | −48 |

We claim as our invention:

A process for the preparation of a lubricating oil which comprises subjecting a mixture of $C_{9-17}$ cracked wax olefins to extractive crystallization with urea, recovering urea-reactive straight chain alpha-mono olefins from the molecular complexes so formed, percolating the recovered olefins over particulate silica gel, polymerizing the percolated olefins with a mixture of 0.1–0.5 mole aluminum trialkyl per mole of titanium tetrachloride at a temperature between about 0° C. and 50° C. and at about atmospheric pressure, fractionally distilling the polymerized oily product consisting essentially only of polymerized straight chain alpha-monoolefins so as to recover the fraction containing substantially no components having less than about nineteen carbon atoms per molecule, and hydrogenating the recovered fraction, whereby a lubricating oil is obtained.

References Cited in the file of this patent

UNITED STATES PATENTS

| | | |
|---|---|---|
| 2,500,163 | Garwood | Mar. 14, 1950 |
| 2,500,166 | Seger et al. | Mar. 14, 1950 |
| 2,759,915 | Gorin | Aug. 21, 1956 |
| 2,918,507 | Kennedy et al. | Dec. 22, 1959 |
| 2,965,691 | Voltz | Dec. 20, 1960 |

FOREIGN PATENTS

| | | |
|---|---|---|
| 553,720 | Belgium | June 27, 1957 |
| 1,139,418 | France | Feb. 11, 1957 |
| 785,314 | Great Britain | Oct. 23, 1957 |

OTHER REFERENCES

Badin: "Jour. of Amer. Chem. Soc.," 1958, vol. 80, pages 6549–6551.